Dec. 31, 1968  JEAN-LOUP POLTI  3,419,110
METHOD OF DRY-LUBRICATING MECHANICAL DEVICES
Filed Feb. 14, 1967
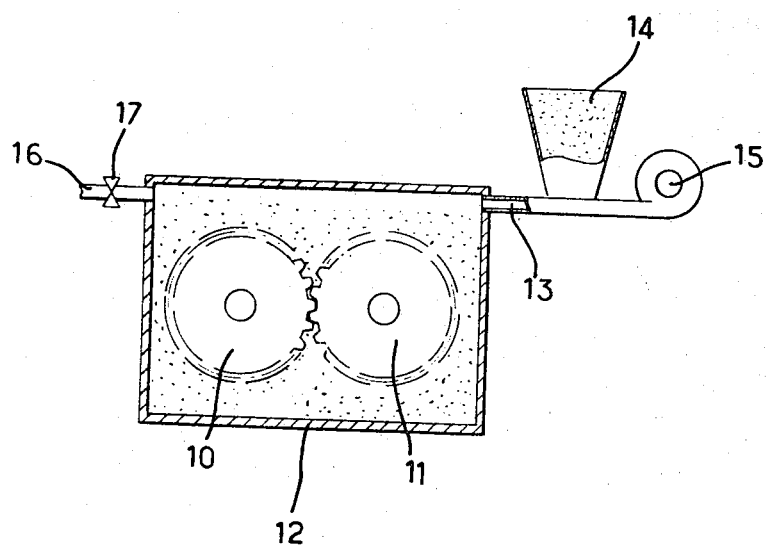
INVENTOR
JEAN-LOUP POLTI
BY Young + Thompson
ATTYS.

United States Patent Office 3,419,110
Patented Dec. 31, 1968

3,419,110
METHOD OF DRY-LUBRICATING MECHANICAL DEVICES
Jean-Loup Polti, Chambon-Feugerolles, France, assignor to Centre Stephanois de Recherche Mecanique, Hydromecanique et Frottement, a corporation of France
Filed Feb. 14, 1967, Ser. No. 616,100
Claims priority, application France, Feb. 14, 1966, 49,479
10 Claims. (Cl. 184—1)

ABSTRACT OF THE DISCLOSURE

Method of dry lubrication of mechanical elements, without liquid, oil and grease, comprising placing said elements in an atmosphere into which is injected a very fine dust of alkali metals and alkaline-earth metal salts consisting of the radicals S, Se, Te, F, Cl, Br, I, P, CN, $CO_3$.

---

The present invention relates to the dry-lubrication of mechanical elements, that is to say lubrication without oil, grease or similar liquid lubricants.

In numerous industrial applications, there occurs more and more often the problem of working mechanisms under difficult conditions, in particular at high temperatures or under conditions in which usual oil or grease lubrication is impossible. In cases of this kind solid lubricants adapted to the required conditions are used.

Such solid lubricants, for example molybdenum disulphide and graphite, have a structure favourable for rubbing, i.e. lamellar or hexagonal. The use of these lubricants solves certain, but not all existing difficulties. Under certain conditions they lack reliability.

I have found that a more efficient, complete and reliable lubricant can be obtained by placing mechanical elements in a closed chamber and injecting into the chamber a finely pulverised dust of alkali metals and alkaline-earth metal salts or mixtures thereof, having melting points higher than the temperature of the chamber, the said salts consisting of at least one of the radicals S, Se, Te, F, Cl, Br, I, P, CN, $CO_3$.

Experience has shown that these pulverised salts, or mixtures thereof, react with the metals in rubbing contact, or one of them, to form, under working conditions, chemically stable compounds.

It should be noted that the pulverised salts introduced into the chamber containing the mechanical elements, are not, in themselves, lubricants. However, by reaction with the metals of the mechanical elements, or one of them, they engender chemical compounds which facilitate rubbing. These compounds, although having a structure not characteristic of usual solid lubricants, i.e. lamellar or hexagonal structure, have revealed themselves as suitable advantageously to replace the latter.

The characteristics and advantages of the invention will be illustrated by the following examples relating to trials made under the conditions indicated in the accompanying drawing.

In this figure, two gears 10 and 11 are in rotation in a closed chamber 12. The chamber 12 receives, through a duct 13, an injection of fine salt powder fed from a hopper 14 and blown by a fan 15.

A duct 16 from the chamber 12, with a tap 17, enables a gas, as for example nitrogen, to be led into the chamber 12, or enables the latter to be evacuated.

The trials hereafter described, were made with gear wheels having a diameter of 240 mm. of standard size 8. These wheels are of steel of nuance 35NC6 having been hardened and tempered. The rate of rotation is 1600 rev./min. The couple transmitted is 450 Nm.

With this device, in the total absence of oil and grease and in an atmosphere of air, the gears seized and were damaged in a fraction of a second after they were set in motion.

In molybdenum disulphide is put in suspension in the chamber 12, an acceptable performance is only obtained for a limited period and in an atmosphere of nitrogen. Breakdowns are numerous and reliability is insufficient.

On the other hand, by proceeding according to the invention, the results of the following examples are obtained.

(1) The gears can rotate in an atmosphere of air, at ordinary temperatures, for several hours, if a finely pulverised mixture of sodium cyanide, potassium cyanide, and potassium cyanate in substantially equal parts is blown into the chamber. After 30 hours of operation, the gears have an absolutely perfect polish.

(2) The atmosphere surrounding the gears was nitrogen this time, and remarkable results were obtained when a very finely pulverised mixture of sodium sulphide, sodium sulphate, and potassium cyanide, in substantially equal parts, was introduced, in suspension, into the chamber; again, in this case, the gears could be rotated for 30 hours, and the surfaces of the gear teeth having been previously totally degreased in ethyl acetate, were always at the end of this time perfectly polished. They were blackened by a layer of FeS due to the reaction of the alkaline sulphates and sulphides on the surfaces of the steel gears.

(3) In another example, the gears were covered electrolytically with a cadmium deposit of 10 microns thickness; the gears, previously degreased in ethyl acetate, were in an atmosphere of nitrogen and the temperature was 20° C. There was then injected into the chamber, finely pulverised, a mixture of alkali metals and alkaline-earth metal iodides which the mixing with the nitrogen atmosphere maintained in suspension. The gears could be turned thus for more than 30 Nm., the surfaces of their teeth being, at the end of this period, perfectly polished. They had an orange colour, indicating the formation on their surfaces of cadmium iodide which had lessened the rubbing.

These examples are, of course, given by way of non-limitative example, and all salts or salt mixtures satisfying the conditions specified above, are a part of the invention.

The invention also includes the fact that the introduction into the atmosphere surrounding a mechanism without oil or grease, of a dry pulverisation of a salt or mixture of salts such as those defined above, improves the lubricating action of a classic solid lamellar lubricant, such as graphite, or molybdenum disulphide, provided that the conditions of atmosphere, temperature, etc., permit the latter to be used. In particular, it is known that he use of molybdenum disulphide as a dry powder is limited, in the industries requiring great reliability, such as the field of aero-space, by the unreliability of its action. However, the presence, in molybdenum disulphide or graphite powder, of a salt or mixture of salts according to the invention, considerably increases the reliability of this dry lubricant.

A non-limitative example illustrates this action.

(4) On the same gear mechanism as described above, there has many times been noted, in the case of lubrication by molybdenum disulphide alone, the time which elapses, in an atmosphere of nitrogen, between starting up and the failure of the pair of gears: in ten trials, this time varied between 10 and 20 Nm. Under the same conditions, however, with the addition to the solid lubricant in suspension of a mixture of sodium sulphide, potassium cyanide and potassium chloride in equal parts, the ratio of the mixture of salts of the invention and the solid lubricant being by weight 20:80, the ten subsequent trials consistently exceeded 60 Nm. Moreover, as soon as the temperature is increased the reliability of the lubricant according to the invention increases whilst the dispersion of the given effects of the classic lubricant is improved.

In another kind of action of the dry lubricant according to the invention, in the case where it is desired to improve a classic lamellar lubricant, there are injected alternately into the vacuum or atmosphere of gas surrounding the mechanism, the salts of the invention and molybdenum disulphide or graphite. Thus at the same time, the reliability of the classic dry lamellar lubricant is improved and the wear due to the attack on the metal by the lubricating method of the invention is diminished, and the result is mechanisms without oil or grease working with extraordinary performances unheard of until now.

Lubrication by the finely pulverised salts according to the invention is more reliable if the rubbing parts are previously subjected to a known surface treatment to make them more absorbent. In a non-limiting example of an improvement of the invention, the foregoing tests were repeated the gears used having been sulphur treated by the process called Sulfinuzation: an improvement in performance of the order of 10% was observed, which improvement was also manifested by a noticeable lowering of the noise level.

What I claim is:
1. A method of dry lubrication of mechanical elements comprising surrounding said elements with an atmosphere containing a dust of finely pulverised alkali metals and alkaline-earth metal salts having a melting point higher than the maximum working temperature of said elements, said salts containing at least one of the radicals from the group consisting of S, Se, Te, F, Cl, Br, I, P, CN, $CO_3$.

2. A method of dry lubrication of mechanical elements, without oil, grease and the like, said method comprising placing the said elements in a closed chamber and injecting into the chamber a dust of finely pulverised alkali metals and alkaline-earth metal salts having a melting point higher than the temperature of the chamber, said salts containing at least one of the radicals from the group consisting of S, Se, Te, F, Cl, Br, I, P, CN, $CO_3$.

3. A method of dry lubrication of mechanical elements, without oil, grease and the like, said method comprising covering said mechanical elements with a solid lubricant of lamellar structure selected from the group containing molybdenum disulphide and graphite, placing said mechanical elements in a closed chamber and injecting into the chamber a dust of finely pulverised salts of an alkali metals and alkaline-earth metal character having a melting point higher than the temperature of the chamber, said salts containing at least one of the radicals from the group consisting of S, Se, Te, F, Cl, Br, I, P, CN, $CO_3$.

4. A method according to claim 2, in which a finely pulverised dust of an alkaline cyanide is injected into the chamber containing said mechanical elements.

5. A method according to claim 2, wherein a finely pulverised dust of a mixture of sodium cyanide, potassium cyanide and potassium cyanate is injected into said chamber containing said mechanical elements.

6. A method according to claim 2, wherein a finely pulverised dust of a mixture of sodium sulphide, sodium sulphate and potassium cyanide is injected into said chamber containing the said mechanical elements.

7. A method according to claim 2, wherein a finely pulverised dust of a mixture of alkaline and alkaline earth iodides are injected into said chamber containing said mechanical elements.

8. A method according to claim 2, wherein said chamber containing said mechanical elements is filled with an inert gas such as nitrogen.

9. A method according to claim 2, wherein said chamber containing said mechanical elements and receiving said pulverised salt dust is evacuated.

10. A method of dry lubrication of mechanical elements, without oil, grease and the like, said method comprising placing metal elements, which have previously received a surface treatment, such as a sulphur treatment, into a closed chamber, and injecting into said chamber a dust of finely pulverised alkaline and alkaline-earth salts, having a melting point higher than that of said chamber, said salts containing at least one of the radicals from the group consisting of S, Se, Te, F, Cl, Br, I, P, CN, $CO_3$.

References Cited

UNITED STATES PATENTS

| | | |
|---|---|---|
| 2,841,244 | 7/1958 | Sorem. |
| 2,952,335 | 9/1960 | Coit et al. _____ 184—1 |
| 2,993,567 | 7/1961 | Schachner _____ 184—1 |
| 3,072,574 | 1/1963 | Buckley _____ 252—15 X |
| 3,301,780 | 1/1967 | Oliver _____ 252—15 X |

HOUSTON S. BELL, JR., *Primary Examiner.*

U.S. Cl. X.R.

252—15, 25